April 21, 1936.   E. K. BROWN   2,038,475
ANTIFRICTION BEARING AND METHOD OF MAKING THE SAME
Filed Sept. 10, 1934
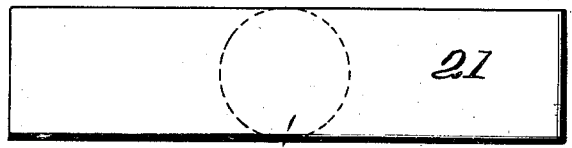
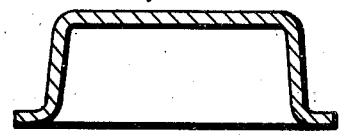 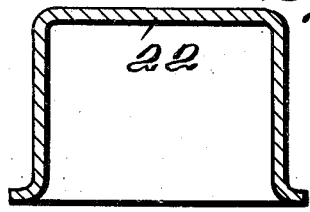
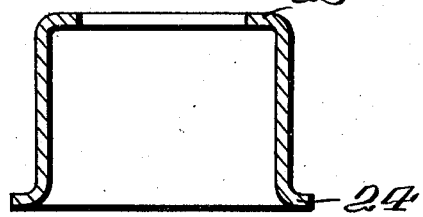 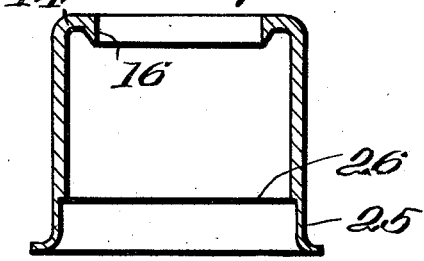
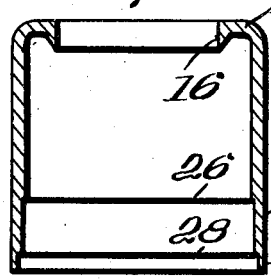 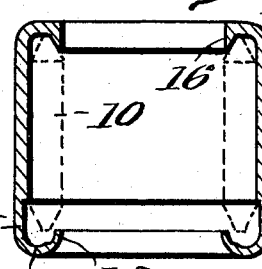 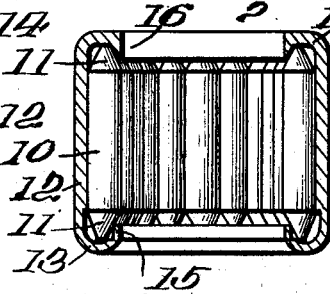
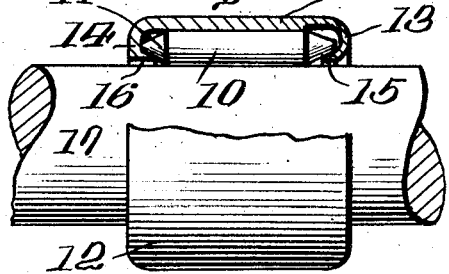 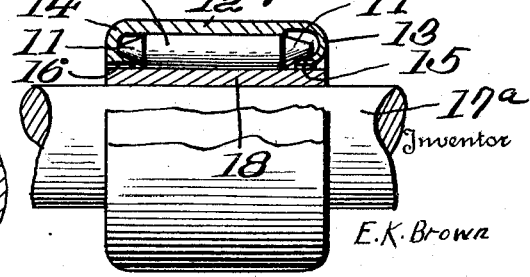
Inventor
E. K. Brown
By Sturtevant + Mason
Attorneys Patented Apr. 21, 1936

2,038,475

UNITED STATES PATENT OFFICE 2,038,475

ANTIFRICTION BEARING AND METHOD OF MAKING THE SAME

Edmund Karl Brown, Torrington, Conn., assignor to The Torrington Company, Torrington, Conn., a corporation of Connecticut Application September 10, 1934, Serial No. 743,465

11 Claims. (Cl. 29—148.4)

The present invention relates to improvements in antifriction bearings and more particularly to an improved roller bushing or bearing and to an improved method of making and assembling the same.

An object of the present invention is to provide an improved self-contained roller bearing wherein a plurality of small diameter rollers having reduced end portions placed in substantially contiguous relation within a retaining sleeve which serves as an outer raceway and wherein the ends of said retaining sleeve are directed inwardly to provide retaining flanges which enclose and hold the reduced ends of the rollers leaving the cylindrical body portions extending within the sleeve beyond the inwardly directed edges whereby to provide an inner roller contact surface.

A further object of the invention is to provide a method of making the retaining sleeve and assembling the rollers therein and this method is an improvement over the method disclosed in applicant's co-pending application, Serial No. 697,045, filed November 7, 1933.

The present method of making and assembling the roller bearing is one which is highly efficient and which materially increases the accuracy and output of manufacturing and yet reduces the cost thereof.

In the accompanying drawing:

Figure 1 is a view of a metal strip from which the sleeve blanks are cut.

Fig. 2 is an enlarged view showing one stage in the formation of the blank.

Fig. 3 is an enlarged view showing a further stage in the formation of the blank.

Fig. 4 is a view similar to Fig. 3 but showing the cup-shaped blank after a portion of the closed end thereof has been removed.

Fig. 5 is an enlarged view showing the final formation of the retaining flange at one end and showing the opposite end portion reduced in thickness.

Fig. 6 is a view similar to Fig. 5 but showing a further reduction in thickness of the extreme edge portion of the sleeve.

Fig. 7 is an enlarged view showing the reduced end portion of the sleeve bent inwardly with the extreme reduced edge directed axially thereof with the rollers inserted.

Fig. 8 is an enlarged view of the completed bearing after the extreme edge portion has been forced axially to enclose and retain the rollers.

Fig. 9 is an enlarged view showing the completed bearing in position on a shaft.

Fig. 10 is a similar view showing a sleeve pressed on the shaft and the completed bearing in position thereon.

The present invention relates generally to a roller bearing which is exceedingly well adapted to be used in place of the usual bearing bushings which are ordinarily employed with rotating shafts but it is to be clearly understood that it may be used in any instance where a roller bearing is employed. The bearing consists generally of a retaining sleeve which is adapted to hold a plurality of small diameter rollers in contiguous relationship. The rollers are provided with reduced end portions which, when inserted in the retaining sleeve, are adapted to be enclosed and held by curled end portions or retaining flanges on the sleeve. Thus, the cylindrical body portion of each roller, that is, the portion between the reduced ends thereof, is adapted to extend beyond the inner edge of the retaining flanges so as to afford a roller contact surface for a shaft with which th. bearing is to be used. The retaining sleeve serves not only as a holder for the rollers but also as a raceway element and is shown in the accompanying drawing, for purposes of illustration, as an outer raceway element. In this instance, the shaft with which the bearing is to be used, or a sleeve pressed on the shaft, serves as the inner raceway element. The present invention relates more particularly to an improved method of making the retaining sleeve and of assembling the rollers therein and this method is an improvement over the method disclosed in applicant's copending application, which was referred to above.

Referring to Figs. 8, 9, and 10 of the accompanying drawing, the completed bearing will be described. The rollers 10 are of relatively small diameter and are of circular cross-section throughout the main body portion thereof. However, the relative length and diameter of the rollers will depend upon the particular use to which the bearing is to be put. The ends 11 of the rollers are reduced in cross-section and are illustrated in the accompanying drawing as being of the chamfered type, but it is to be clearly understood that they may be of any type which affords a reduced end portion for the purposes which are to be hereinafter pointed out. The retaining race 12 consists of a cylindrical sleeve or shell which may be formed from a metal blank, in a manner to be described hereinafter. The end portions 13, 14 of the sleeve 12 are directed inwardly during the manufacture thereof and the extreme annular edges 15, 16 thereof are further bent or curled within the sleeve to provide annular grooved or retaining flanges which are adapted to enclose and hold the reduced ends 11 of the rollers 10. Extreme annular edges 15, 16 of the end portions 13, 14 respectively present continuous and uninterrupted surfaces around the same. These rollers are fitted around the sleeve 12 in substantially contiguous relationship and the cylindrical body portions thereof extend beyond the extreme edges 15, 16 within the sleeve so as to provide a roller contact surface for a shaft or the like. Opposite reduced ends 11 of the rollers 10 are disposed within the end portions 13, 14 and are free to contact therewith and with the annular edges 15, 16. The extreme edges 15, 16 on the sleeves 12 do not inhibit the action of the rollers but, as stated above, the reduced ends of the rollers are free to contact therewith in order to provide a self-contained unit. The reduced ends of the rollers are thus of importance because they permit the retaining flanges on the sleeve to hold the rollers and, at the same time, permit the body portion of the rollers to extend within the sleeve in order to contact with the shaft or the like with which the bearing is used. Such a bearing is self-contained and may be handled as a unit and, as stated above, may be employed to replace the conventional bushings. As shown in Fig. 9, the bearing may be fitted directly on a shaft 17, or, as shown in Fig. 10, a sleeve 18 may be pressed on a shaft 17a and the bearing fitted over the said sleeve. In the first instance (Fig. 9), the retaining sleeve 12 serves as the outer raceway element and the shaft 17, itself, serves as the inner raceway element. In the second instance (Fig. 10), the retaining sleeve 12 serves as the outer raceway element, but the pressed sleeve 18 serves as the inner raceway element.

As to the manner of forming the retaining sleeve 12 and of assembling the rollers 10 therein, reference will be had to Figs. 1-8 inclusive. A blank 20 is stamped or cut from a metal strip 21 and is then operated upon by a drawing or forming process which gradually forms the blank into a cup-shaped member (Fig. 2) and then into an elongated cup-shaped member (Fig. 3). The central portion of the closed end 22 of the cup member is then removed by a punching or other suitable process in order to leave an inwardly extending flange portion 23. It is, of course, to be understood that this punching operation may be performed at some other stage, as for instance, at the beginning of the forming operation or at some intermediate stage. The extreme inner edge 16 of the flange 23 is then forced inwardly by a suitable process in order to form the annular trough or retaining flange 14 for the ends of the rollers. The opposite or open circular edge 24 of the sleeve is then reduced in thickness by suitable steps which will be explained below. This step is of the utmost importance because this end of the sleeve must also be curled inwardly to enclose and retain the opposite reduced ends of the rollers, and there is a tendency for the metal to crowd and buckle. By reducing the thickness of the metal at this point, the tendency for the metal to buckle is counteracted so that a more accurate bearing is thus afforded. If the metal were bent outwardly, there would be no necessity to reduce the thickness of the edge because, in such a case, the tendency is for the metal to spread. The edge portion 24 is drawn or otherwise operated upon to leave a portion 25 of reduced thickness from a shoulder 26 thus formed.

This step is clearly shown in Fig. 5 of the drawing. The extreme edge of the reduced portion 25 is then further drawn to leave an additional portion 15 of reduced thickness from the shoulder 28 out to the end of the sleeve. This last step is clearly shown in Fig. 6 of the drawing. These successive drawing or thickness reducing operations are properly proportioned to definitely locate the shoulders 26 and 28 and may be performed at any suitable stage in the process of manufacture. The reduced edge portion 25 above the shoulder 26 is bent or curled inwardly with the extreme reduced edge portion 15 directed toward the opposite end of the sleeve, as shown in Fig. 7. When the sleeve has reached this stage, it is subjected to any suitable hardening and polishing process before the rollers 10 are inserted. After the hardening and polishing process, the rollers 10 are inserted in contiguous relation within the sleeve with one reduced end of each roller disposed within the annular retaining flange 14 and with the opposite reduced end of each roller under the reduced end portion of the sleeve, as also shown in Fig. 7. It will be noted that the reduced end portions 25 and 15 are curled inwardly only to a position wherein the rollers may be inserted. After the rollers have been inserted, the extreme reduced edge portion 15 is forced down over the reduced ends 11 of the rollers 10 to a position wherein it is substantially parallel to the axis of the bearing to form the retaining flange 13, as shown in Fig. 8. In this manner the rollers 10 are held within the sleeve with the cylindrical body portions thereof extending beyond the edges 15 and 16 of the sleeve 12 so as to provide a roller contact surface for a shaft. It will be particularly noted that bending takes place in the portion 25 and it is for this reason that the thickness of the metal is reduced therein so as to prevent buckling and to afford an accurate bearing. It will be further noted that the the shoulder 28 is over the ends of the rollers in the completed bearing and this shoulder serves to accurately determine the point at which the extreme edge portion 15 begins to bend. This is an important feature because with extremely small rollers, it is imperative to assemble the bearing so that there will be an accurate fitting of the rollers and the retaining flanges.

It is thus apparent from the foregoing description that a highly efficient roller bearing is herewith provided and that this roller bearing is made by a method which renders the same inexpensive and extremely accurate so that it is well adapted for production in quantity. The bearing is self-contained and may be handled as a unit which fact is of importance because it is difficult to handle such small rollers in a bearing. The present method obviates the difficulty and provides a retaining sleeve which may be accurately manufactured so that even the smallest rollers may be accurately assembled therein and held by the retaining flanges. Such a bearing may be employed as a replacement for the usual bronze and brass bushings as well as numerous other uses.

It is to be understood, of course, that minor details and changes may be made in the method and in the completed bearing without departing from the scope of the invention as set forth in the appended claims.

Having thus fully described my invention, what I claim as new and desire to secure by Letters Patent, is:—

1. The method of making a roller bearing assembly which consists in forming from a metal blank a cylindrical sleeve having a radially extending flange at one end thereof, forming said flange into trough shape, forming a plurality of continuous annular reduced portions at the opposite end of said sleeve, inserting a plurality of cylindrical rollers having reduced ends into said sleeve in substantially contiguous relation with one reduced end of each roller disposed within said trough-shaped flange, and curling the reduced portions of said sleeve radially thereof to form a retaining flange to enclose the opposite reduced ends of said rollers whereby to provide a self-contained roller bearing unit.

2. The method of making a roller bearing assembly which consists in forming from a metal blank a cylindrical sleeve, forming a radially extending annular retaining flange at one end thereof, reducing the thickness of the opposite end of said sleeve in a plurality of successive operations whereby to leave continuous annular reduced portions of different thicknesses, inserting a plurality of cylindrical rollers having reduced ends in said sleeve in substantially contiguous relation with one reduced end of each roller disposed within said retaining flange, and curling the reduced end of said sleeve radially to form a retaining flange opposed to said first-named retaining flange and to enclose and hold the opposite reduced ends of said rollers whereby to provide a self-contained roller bearing unit.

3. The method of making a roller bearing assembly which consists in forming from a metal blank a cylindrical sleeve, forming a radially extending annular retaining flange at one end thereof, reducing the thickness of the opposite end of said sleeve in a plurality of successive operations whereby to leave continuous annular reduced portions of different thicknesses, subjecting said sleeve to a hardening and polishing process, inserting a plurality of cylindrical rollers having reduced ends in said sleeve in substantially contiguous relation with one reduced end of each roller disposed within said retaining flange, and curling the reduced end of said sleeve radially to form a retaining flange opposed to said first-named retaining flange and to enclose and hold the opposite reduced ends of said rollers whereby to provide a self-contained roller bearing unit.

4. The method of making a roller bearing assembly which consists in forming from a metal blank a cylindrical sleeve having an inwardly extending flange at one end thereof, forcing the inner edge of said flange axially to form a trough-shaped retaining flange, reducing the thickness of the opposite end of said sleeve in a plurality of successive operations whereby to leave spaced shoulders thereon, curling the reduced end of said sleeve inwardly with the extreme edge thereof extending toward the center of said sleeve, inserting a plurality of cylindrical rollers having reduced ends around said sleeve in contiguous relation with one reduced end of each roller disposed within said retaining flange and with the opposite ends of said rollers disposed under said curled reduced end portion of said sleeve, and forcing the extreme reduced portion of said sleeve axially to enclose and hold the reduced ends of said rollers whereby to provide a self-contained bearing assembly.

5. The method of making a roller bearing assembly which consists in forming from a metal blank a cylindrical sleeve having an inwardly extending flange at one end thereof, forcing the inner edge of said flange axially to form a trough-shaped retaining flange, reducing the thickness of the opposite end of said sleeve in a plurality of successive operations whereby to leave spaced shoulders thereon, curling the reduced end of said sleeve inwardly with the extreme edge thereof extending toward the center of said sleeve, subjecting said sleeve to a suitable hardening and polishing process, inserting a plurality of cylindrical rollers having reduced ends around said sleeve in contiguous relation with one reduced end of each roller disposed within said retaining flange and with the opposite ends of said rollers disposed under said curled reduced end portion of said sleeve, and forcing the extreme reduced portion of said sleeve axially to enclose and hold the reduced ends of said rollers whereby to provide a self-contained bearing assembly.

6. The method of making a roller bearing assembly which consists in forming from a metal blank a cylindrical sleeve, forming an inwardly extending annular retaining flange at one end thereof, reducing the thickness of the opposite end of said sleeve leaving a shoulder, further reducing the thickness of the extreme edge of said sleeve leaving a second shoulder, curling the reduced portion inwardly with the extreme edge thereof extending axially of said sleeve, inserting a plurality of cylindrical rollers having reduced ends in said sleeve in substantially contiguous relation with one end of each roller disposed within said retaining flange and with the opposite end of each roller disposed under said second shoulder, and finally forcing said reduced end of said sleeve axially whereby said extreme edge portion encloses and holds the ends of said rollers to provide a self-contained bearing assembly.

7. The method of making a roller bearing assembly which consists in forming from a metal blank a cylindrical sleeve, forming an inwardly extending annular retaining flange at one end thereof, reducing the thickness of the opposite end of said sleeve leaving a shoulder, further reducing the thickness of the extreme edge of said sleeve leaving a second reduced shoulder, curling the reduced portion inwardly with the extreme edge thereof extending axially of said sleeve, subjecting said sleeve to a suitable hardening and polishing process, inserting a plurality of cylindrical rollers having reduced ends in said sleeve in substantially contiguous relation with one end of each roller disposed within said retaining flange and with the opposite end of each roller disposed under said second shoulder, and finally forcing said reduced end of said sleeve axially whereby said extreme edge portion encloses and holds the ends of said rollers to provide a self-contained bearing assembly.

8. The method of making a roller bearing assembly which consists in forming from a metal blank a cylindrical sleeve having an inwardly extending flange, forcing the inner edge of said flange axially of said sleeve to provide a trough-shaped retaining flange, reducing the thickness of the opposite end of said sleeve, further reducing the thickness of the extreme edge of said sleeve whereby to leave an internal shoulder, curling the reduced portion inwardly with the extreme edge thereof bent adjacent said shoulder to extend axially of said sleeve, inserting a plurality of cylindrical rollers having reduced ends within said sleeve in contiguous relation with one reduced end of each roller disposed within said retaining flange and with the opposite end of each roller disposed under said shoulder, and forcing the reduced portion of said sleeve axially to enclose and hold the ends of said rollers whereby to provide a self-contained bearing.

9. The method of making a roller bearing assembly which consists in forming from a metal blank a cylindrical sleeve having an inwardly extending flange, forcing the inner edge of said flange axially of said sleeve to provide a trough-shaped retaining flange, reducing the thickness of the opposite end of said sleeve, further reducing the thickness of the extreme edge of said sleeve whereby to leave an internal shoulder, curling the reduced portion inwardly with the extreme edge thereof bent adjacent said shoulder to extend axially of said sleeve, subjecting said sleeve to a hardening and polishing process, inserting a plurality of cylindrical rollers having reduced ends within said sleeve in contiguous relation with one reduced end of each roller disposed within said retaining flange and with the opposite end of each roller disposed under said shoulder, and forcing the reduced portion of said sleeve axially to enclose and hold the ends of said rollers whereby to provide a self-contained bearing.

10. In a self-contained antifriction bearing, the combination of a one-piece sheet metal cylindrical raceway element having an inwardly directed annular curved retaining flange at one end thereof and having a plurality of reduced peripheral portions at the opposite end thereof, and a plurality of small diameter cylindrical rollers having reduced end portions, said rollers being fitted around the inner surface of said element in substantially contiguous relationship, with one reduced end of each roller disposed within said retaining flange, the reduced portions at the other end of said element being bent to partially enclose the opposite reduced end of each roller, the said reduced ends of each roller being free to contact with said retaining flange and with the bent portions at the opposite end of said raceway element whereby to provide a self-contained antifriction bearing which may be handled as a unit.

11. The method of making a roller bearing assembly which consists in forming a trough-shaped annular flange at one end of the metal sleeve, progressively reducing the thickness of the metal at the opposite end of the sleeve, assembling a plurality of small diameter cylindrical rollers within the sleeve with one reduced end of each of said rollers disposed within and free to contact with said flange, and shaping the reduced portion to form a similar flange to enclose the opposite reduced ends of said rollers.

EDMUND KARL BROWN.